United States Patent [19]
Dimitriadis et al.

[11] Patent Number: 5,664,948
[45] Date of Patent: Sep. 9, 1997

[54] DELIVERY OF DATA INCLUDING PRELOADED ADVERTISING DATA

[75] Inventors: Dimitri Dimitriadis, Lake Oswego; Michael C. Park, Portland, both of Oreg.

[73] Assignee: Seiko Communications Holding N.V., Netherlands Antilles

[21] Appl. No.: 320,530

[22] Filed: Oct. 11, 1994

Related U.S. Application Data

[63] Continuation-in-part of Ser. No. 282,893, Jul. 29, 1994, and a continuation-in-part of Ser. No. 283,276, Jul. 29, 1994.

[51] Int. Cl.⁶ ............ G09B 5/00; G01B 7/14; G08G 1/123; G01S 3/02
[52] U.S. Cl. ............ 434/307 R; 324/207.26; 324/226; 324/260; 33/355 R; 340/989; 342/457; 342/458; 701/300
[58] Field of Search ........................ 434/307 R

[56] References Cited

U.S. PATENT DOCUMENTS 4,857,840   8/1989   Lanchais ................... 324/207
4,973,952  11/1990   Malec et al. .............. 340/825.35

Primary Examiner—Richard J. Apley
Assistant Examiner—John Edmund Rovnak
Attorney, Agent, or Firm—Elmer Galbi

[57] ABSTRACT

Advertising information is preloaded into a collection of remote receiving and presentation devices. A presentation command delivered to the device then causes presentation of the stored advertisement. Each stored advertisement is also associated with one or more presentation conditions causing, when detected, automatic presentation. Such presentation conditions include proximity to a given location, scheduled periodic presentation, time of day presentation, and a variety of other conditions detectable at the remote presentation device. The illustrated method and apparatus for advertising presentation requires but a single broadcast signal transmission of a given advertisement, but provides multiple presentations of such advertisement at the presenting devices. In this manner, the advertiser enjoys efficient use of broadcast signal transmission time.

5 Claims, 6 Drawing Sheets

400
400a — INDEX
400b — CONDITION LIST
400c — DATA TYPE
400d — DATA 500
500a — STORE, INDEX, DATA
500b — DELETE, INDEX
500c — PRESENT, INDEX
500d — SET CONDITIONS, INDEX, DATA
500e — RECORD ON, INDEX
500f — RECORD OFF

DELIVERY OF DATA INCLUDING PRELOADED ADVERTISING DATA

RELATED APPLICATIONS

The present application is a continuation-in-part of copending application entitled DUAL CHANNEL ADVERTISING REFERENCING VEHICLE LOCATION under U.S. patent application Ser. No. 08/282,893 filed Jul. 29, 1994 by a named applicant herein and assigned in common to the assignee of the present application; and further a continuation-in-part of copending application entitled EDUCATION AND ENTERTAINMENT DEVICE WITH DYNAMIC CONFIGURATION AND OPERATION under U.S. patent application Ser. No. 08/283,276 filed Jul. 29, 1994 by a named applicant herein and assigned in common to the assignee of the present application. The disclosures of U.S. patent application Ser. Nos. 08/282,893 and 08/283,276 are incorporated herein fully by reference thereto.

FIELD OF THE INVENTION

The present invention relates generally to vehicle information systems, and particularly to vehicle information systems collecting and presenting information.

BACKGROUND OF THE INVENTION

Advertisement presentation requires, first creation of advertisement information and subsequent dissemination by broadcast signal to receiving devices. To expose listeners to advertisements, the listeners must be monitoring the broadcast signal, e.g., listening to the radio at the time of broadcast. Advertisers expend substantial effort and expense in maximizing the number of listeners by timing advertisement broadcasts with expected times of target listening audiences. In other words, an advertisement is broadcast at particular times with the hope that the maximum number of listeners are exposed to the advertisement. Accordingly, certain broadcast times become most popular for advertisement broadcast and, therefore, the most expensive signal transmission times.

One of the traditional and long standing devices for delivering information to a vehicle is the car radio receiving radio transmissions from local AM or FM radio stations. The operator tunes the radio to a selected radio station and monitors information provided by radio broadcast concurrent with its transmission, i.e., listens to the radio announcer, advertisements, and the like concurrent with transmission via radio signal. To deliver a given advertisement to a radio, therefore, the radio must be on and tuned to the appropriate radio station concurrent with transmission of the advertisement.

Wide dissemination of advertising information requires multiple transmissions on multiple radio stations. The advertiser thereby exposes more listeners to the advertising information, and thereby achieves a desired goal of exposing listeners to product or service information and availability. The advertiser must pay, however, for each advertising message transmission on each radio station. Accordingly, substantial expense is incurred in connection with broadcast of any given advertisement.

It would be desirable to make the process of delivering advertising information to listeners more efficient. In particular, it would be desirable disseminate such advertising information once and have the advertisement presented multiple times. The subject matter of the present invention provides such a method and apparatus for delivery of advertising information.

SUMMARY OF THE INVENTION

The present invention delivers data and information including advertising information to a receiving device. In accordance with the present invention, data which can include advertising information is transmitted to a receiving device and then it is collected and stored within the receiving device. The receiving device intermittently presents stored information to a listener. The receiving device can provide multiple presentations of advertising information which was transmitted to the receiving device one time by radio signal. Presentation of the advertising information at the receiving device may be triggered by a variety of functions. Stored advertising information entries may be presented, for example, by reference to a time schedule, to current receiving device location, or to receiving device events such as power-up. Because the advertising information is broadcast only one time and presented multiple times, the advertiser incurs less expense for each advertisement presentation, there being multiple advertisement presentations for one radio signal transmission.

The subject matter of the present invention is particularly pointed out and distinctly claimed in the concluding portion of this specification. However, both the organization and method of operation of the invention, together with further advantages and objects thereof, may be best understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF A PREFERRED EMBODIMENT

The preferred form of the present invention provides a mechanism efficiently delivering advertising information to listeners. In the preferred form of the present invention, a receiving device which includes a combination of a car radio and a paging device collects and stores advertising information for later presentation. Particular advertising information in the form of voice presentation or text presentation is sent to the receiving device by radio signal transmission once, and then presented multiple times at the receiving device. Once stored at a receiving device, a variety of conditions trigger presentation of the advertisement. In the preferred embodiment shown herein the receiving device is a vehicle information device carried by a vehicle which collects data utilizing a paging system protocol to provide advertisement presentations.

Figure 1:
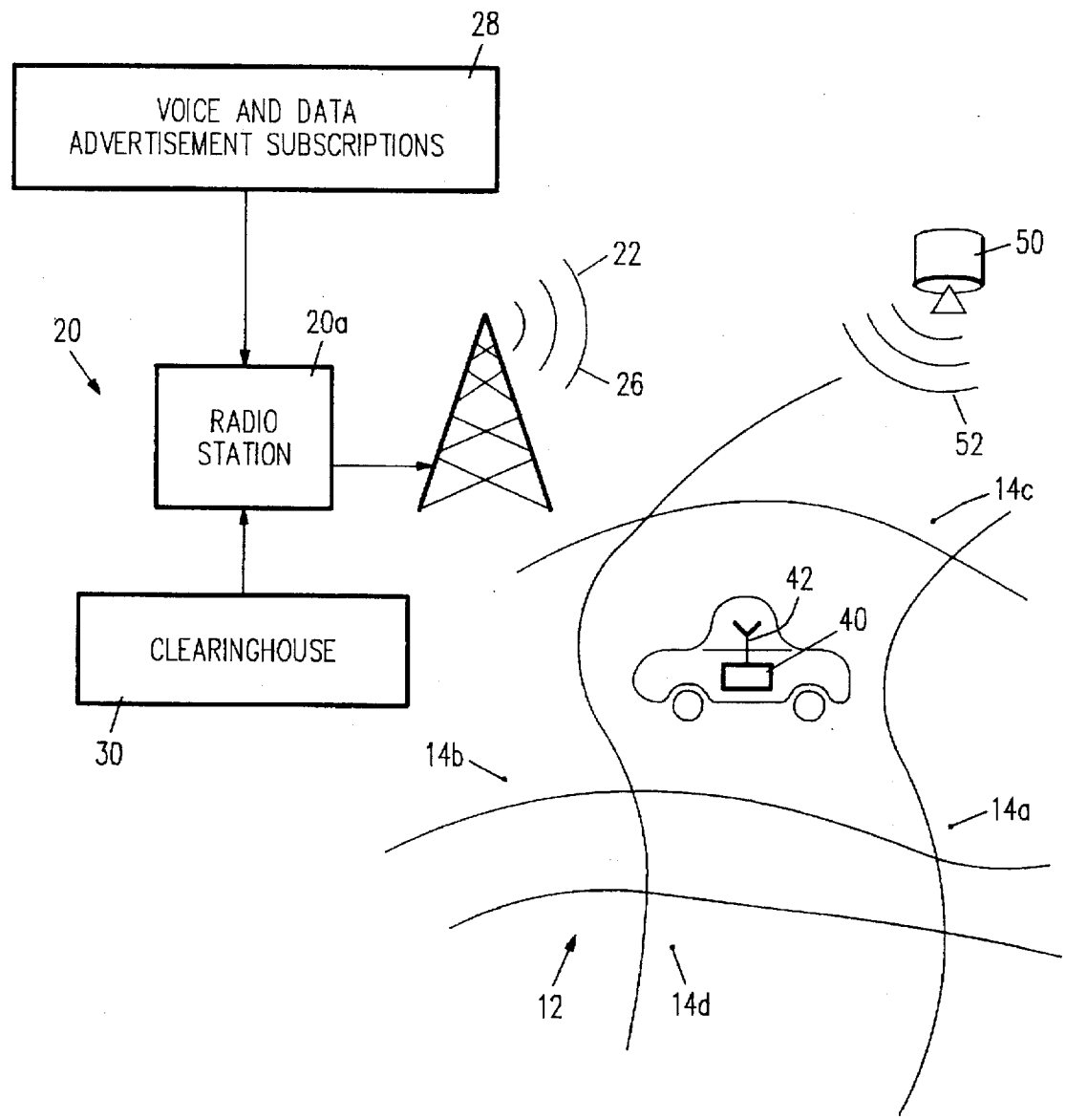
FIG. 1 illustrates a vehicle information system, a given road network, and a vehicle travelling within the road network and carrying a travel information device according to a preferred form of the present invention.

In FIG. 1, a vehicle 10 is shown within a road network 12. Network 12 includes main arterial roadways as illustrated, but it could be significantly more complex. In the preferred embodiment shown herein, vehicle 10 can travel throughout road network 12 along any selected travel route. Road network 12 includes geographic points of interest 14, individually designated 14a–14d associated with longitude and latitude positional criteria. While only several such geographic points of interest 14 are indicated in FIG. 1, any number of such geographic points of interest 14 may exist within road network 12. As described more fully hereafter, advertising information downloaded to the information device of vehicle 10 may be associated with certain geographic points of interest 14, i.e., the location at which advertised goods or services are available. As vehicle 10 passes by or near such geographic points of interest 14, the receiving device of vehicle 10 holding a related advertisement automatically presents such advertisement whereby the operator of vehicle 10 is exposed to an advertisement for goods or services at a nearby location.

Radio broadcast system 20 provides a combined radio signal voice broadcast 22 and radio signal data broadcast 26. While illustrated as a single radio broadcast system 20, voice broadcast 22 and data broadcast 26 could originate from separate radio signal broadcast facilities. Under the preferred form of the present invention, however, voice broadcast 22 and data broadcast 26 originate from a common FM radio source. The present invention may be implemented according to many paging system protocols, but as illustrated herein operates under the time-division multiplexed protocol of the paging system illustrated in U.S. Pat. Nos. 4,713,808 and 4,897,835 and as commercially implemented by Seiko Telecommunication Systems, Inc. under the trademarks RECEPTOR and ACTTIV. Generally, the paging system uses FM radio signal transmission facilities to broadcast, within a side-band frequency, paging signal data packets according to a time-division multiplexed protocol. Thus, voice broadcast 22 comprises the normal FM radio signal broadcast and data broadcast 26 represents the sideband paging system broadcast. The paging system and associated receiving devices provide an inexpensive, highly battery-efficient and highly miniaturized paging device which, under the illustrated embodiment of the present invention, constitutes a data radio receiver 62 (FIG. 2) as a conduit for data broadcast 26 delivery to device 40. The disclosure of U.S. Pat. Nos. 4,713,808 and 4,897,835 are incorporated herein fully by reference thereto.

It will be understood, therefore, that radio broadcast system 20 provides coordinated voice and data by radio signal. Radio broadcast system 20 receives voice advertisement and data message information 28, e.g., an advertising subscription, and integrates the data message portion thereof with other incoming paging system data packets originating from a paging system clearinghouse 30. The data message portion of information 28 could be routed through clearinghouse 30, in which case radio station 20a transmits data broadcast 26 as originating entirely from clearinghouse 30. In any event, radio station 20a transmits coordinated voice and data broadcasts 22 and 26.

Vehicle 10 includes a travel information device 40 receiving by way of antenna 42 the voice broadcast 22 and data broadcast 26. Thus, device 40 receives conventional FM voice broadcasts and paging data packets transmitted under the paging system protocol. While illustrated herein as a vehicle travel information device, device 40 can also be any information device, e.g., a paging device, a personal radio, or portable personal computer.

FIG. 1 also illustrates a global position system (GPS) satellite 50 providing transmission 52. Details and use of GPS transmission 52 to determine location of a GPS receiver carried by vehicle 10 are well known. Use of GPS transmission 52 under the present invention is by incorporation of a GPS receiving device into travel information device 40 and collection of current vehicle 10 position therewith as described more fully hereafter.

Thus, travel information device 40 receives several channels of information. Voice broadcast 22 provided by radio broadcast system 20 provides a stream of analog voice information. Data broadcast 26 provides further advertising information, e.g., digital, voice or text information, to be captured by device 40. Third, the GPS transmission 52 provides current vehicle location.

As described more fully hereafter, device 40 captures and stores selected portions of voice and data broadcast 22 and 26, i.e., advertisements. Once advertisements from voice and data broadcasts 22 and 26 are stored within device 40, subsequent conditions or explicit commands trigger presentation thereof to the operator of vehicle 10 whereby a given advertisement may be presented multiple times to the operator of vehicle 10, yet need only be broadcast to receiving device 40 once. Conditions causing presentation of stored advertising information include, but need not be limited to, vehicle 10 being at or near a given geographic point of interest 14, e.g., by reference to current vehicle position, time of day, power-up of receiving device 40, or in response to a paging signal command delivered to receiving device 40 and causing presentation of a selected advertisement stored within receiving device 40.

Figure 2:
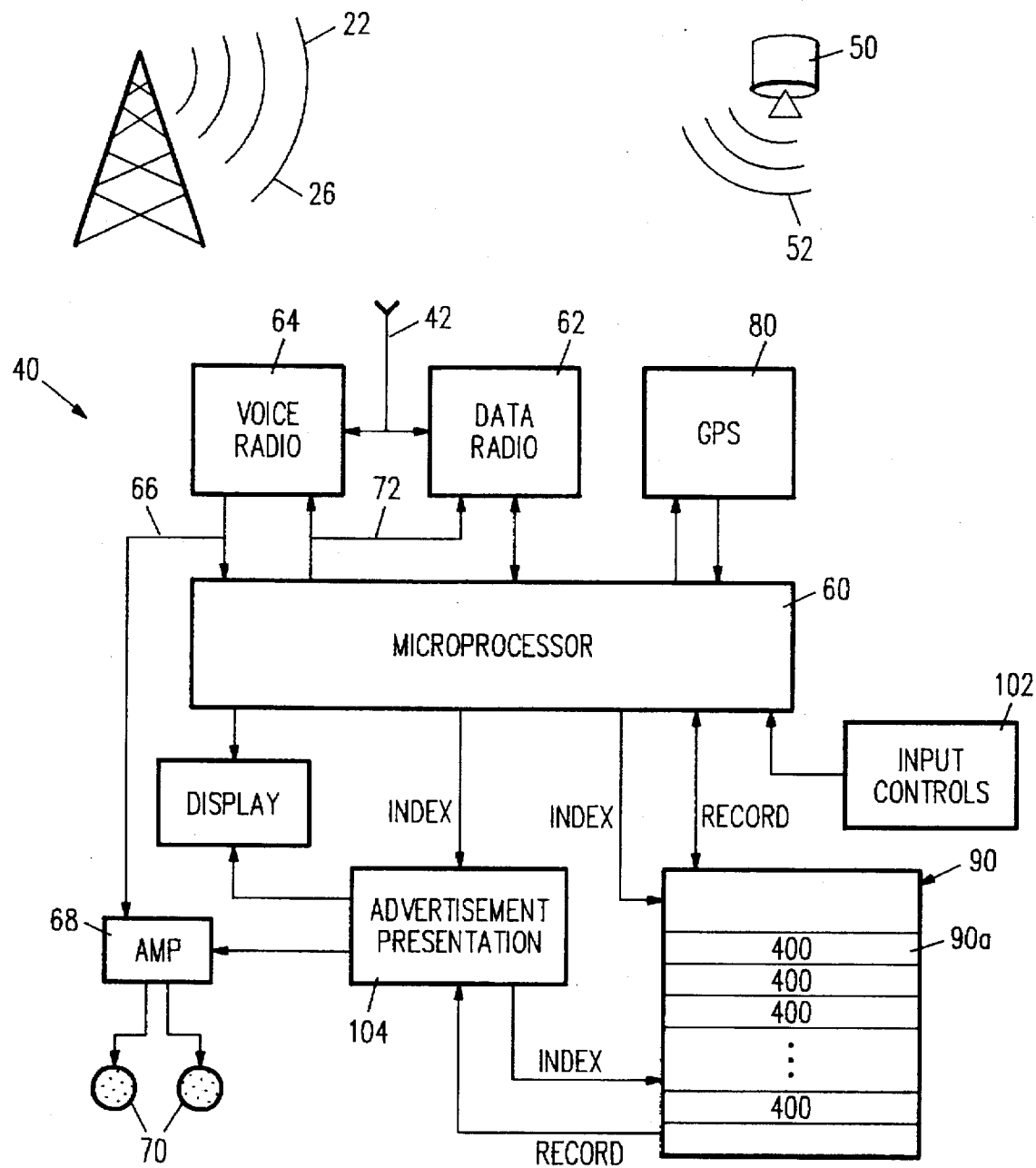
FIG. 2 is a block diagram of the travel information device for the vehicle of FIG. 1.

FIG. 2 illustrates in block diagram travel information device 40. In FIG. 2, a microprocessor 60 orchestrates generally operation of device 40. While referred to generally herein as "microprocessor" 60, it will be understood that such device includes additional supporting hardware features such as analog-to-conversion and digital-to-conversion and other such related input/output hardware required to support the features described herein. Data radio receiver 62 couples antenna 42 to microprocessor 60. As contemplated under the preferred form of the present invention, data radio receiver 62 comprises essentially a paging system receiver operating under the paging system. Thus, the paging system paging device provided as receiver 62 serves as a data terminal collecting data broadcast 26 and providing to microprocessor 60 digital advertising, e.g., text or digitized voice data. A voice radio receiver 64, also coupled to antenna 42, receives the voice broadcast 22 and delivers a voice signal 66 to microprocessor 60 and to an amplifier 68 driving speakers 70. Application of voice signal 66 to microprocessor 60 includes appropriate analog-to-digital conversion whereby microprocessor 60 converts, when necessary, voice signal 66 to a digitized recording thereof. Microprocessor 60 tunes voice radio receiver 64 and data radio 62 by way of a tune control signal 72. Thus, microprocessor 60 establishes coordinated tuning for voice radio 64 and data radio 62 whereby coordinated voice and data broadcast 22 and 26 are received by radios 64 and 62, respectively.

A read/write memory resource 90 stores an indexed data table 90a containing advertisement records 400 available for presentation by device 40. Microprocessor 60 loads records 400 into memory resource 90 in association with an appropriate index value and retrieves records 400 from the memory resource by providing an index value thereto.

An advertisement presentation block 104 receives from microprocessor 60 an index value and has direct access to the memory resource 90 for presentation of advertisements stored therein. Thus, microprocessor 60 queues advertisement presentation by providing a sequence of index values to the advertisement presentation block 104. The advertisement presentation block, in turn, accesses memory resource 90 by reference to a queued index value and collects the requested advertisement record 400 for presentation. As may be appreciated, message presentation block 104 reacts to the record 400 data type to determine how the advertisement data is to be interpreted and presented, i.e., selects one or both of display 100 and speakers 70 for presentation. Thus, advertisement presentation block 104 may deliver text type data taken from a record 400 to display 100 for presentation thereon, or may employ digitized sound data to produce an audio signal suitable for application to amplifier 68 and presentation on speakers 70. Additionally, advertisement presentation block 104 may be provided with, for example, text-to-speech conversion capability for presentation of text type data found in one of records 400 upon speakers 70. In any case, advertisement presentation block 104 responds to the content, i.e., data type, of each record 400 queued for presentation and selects an appropriate mode of presentation by way of display 100 or amplifier 68 and speakers 70.

A global position system receiver 80 receives the transmission 52 from global position system satellite 50 and delivers to microprocessor 60 a current vehicle location 82. In this manner, microprocessor 60 requests from global position system radio receiver 80 a current vehicle location and receives in return the current vehicle location 82.

Display 100 presents, for example, tuning and station selection information relative to the voice radio receiver 60 to provide an FM radio capability wherein the operator of vehicle 10 manipulates input controls 102, i.e., volume and station tuning, to listen to a selected voice broadcast 22. Display 100 further presents, advertising text as taken from advertisement records 400 having a text type data field.

Figures 3, 4, 5:
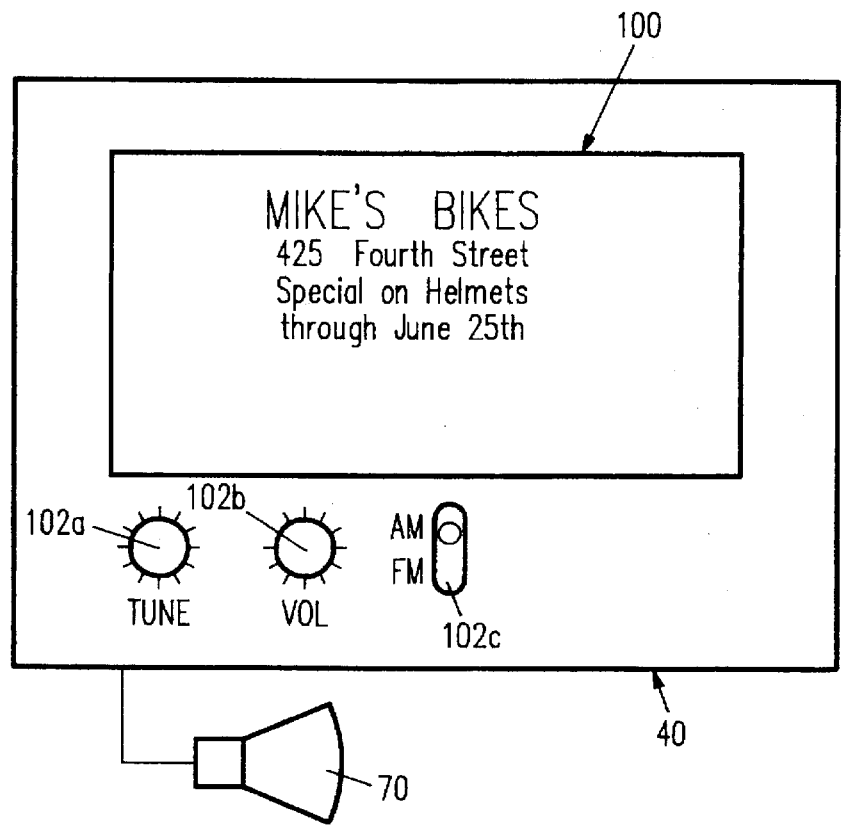
FIG. 3 illustrates the front panel controls and display of the travel information device of FIG. 2 as viewed by the operator of the vehicle of FIG. 1.
FIG. 4 illustrates a record structure for advertisement records maintained in the travel information device of FIGS. 1–3.
FIG. 5 illustrates a command set used in creation and management of advertisement records illustrated in FIG. 4.

FIG. 3 illustrates display 100 and input controls 102. Input controls 102 include a tune dial 102a, a volume dial 102b and an AM/FM switch 102c. As may be appreciated, device 40 operates, from a user perspective, in part as a conventional car radio. Thus, the user manipulates input controls 102a–102c to listen to a voice broadcast 22 on speakers 70.

FIG. 4 illustrates generally the structure of records 400 maintained in device 40. In FIG. 4, each record 400 includes a unique index 400a, a condition list 400b, and a data type 400c. As may be appreciated, the index 400a provides addressing to specific records held by device 40. Because broadcast system 20 is a one-way communication, assignment of values to index 400a for each record 400 is external of device 40, i.e., when advertising information is downloaded to device 40 it must be associated with a value for index 400a whereby an external entity references the index 400a to, for example, trigger presentation of such advertising information. Thus, values for index 400a are designated and later used by the source or entity placing information in device 40 by way of broadcast system 20.

Condition list 400b for each record 400 provides a set of conditions indicating presentation of the associated advertising information. For example, condition list 400b includes a schedule of presentation, a time of presentation, a location such as longitude and latitude where associated products or services are available, or a device 40 event such as power-up. By scanning the condition lists 400b for a collection of records 400 and comparing such conditions to current detected conditions, device 40 determines when a given advertisement stored in device 40 need be presented.

Data type field 400c indicates the type of data held in each record 400. As may be appreciated, data field 400d may include a variety of data types, e.g., text, digitized voice data, graphics data and special data formats such as mixed data type. Thus, when a given advertisement record 400 is to be presented, the data type field 400c dictates how the data field 400d is interpreted and presented by device 40.

As may be appreciated, in may instances the data field 400d must be of substantial size. Under the paging system, a series of data packets may be linked together and delivered to a receiving device 40. In essence, device 40 receives indication that a linked list of data packets are required and successively targets each next packet in the list, i.e., targets an appropriate time slot under the time-division multiplex protocol, to collect the sequence of linked data packets and thereby build a data field 400d of indefinite length. Because advertising information need not be presented immediately upon collection by device 40, such large volume data transmissions, i.e., large volume data fields 400d such as digitized sound data, may be downloaded into devices 40 during low system activity times, e.g., at night when system demands are low.

FIG. 5 illustrates a command set employed in the manipulation of devices 40. In particular, a set of commands delivered by way of paging data packets drives each device 40 in the downloading of advertisement records 400 and management thereof including the triggering of advertisement presentation. In FIG. 5, command set 500 includes a STORE command 500a. STORE command 500a is associated with an index parameter and a data parameter. As may be appreciated, the index parameter value is written into the index field 400a of the associated new record 400 and the data parameter is written into the data field 400d of the new associated database record. Furthermore, the data parameter of STORE command 500a may be of significant length, i.e., may be digitized sound, and therefore necessarily collected through a sequence of linked paging system data packets. Accordingly, the data parameter of STORE command 500a can be actual data or an address pointer to the beginning of a linked list of paging system data packets containing data representing advertising information.

DELETE command 500b and its index parameter causes deletion from the memory resource 90 of the record 400 stored under the associated index.

PRESENT command 500c and its index parameter cause device 40 to present the associated advertisement information, i.e., queue for presentation the record 400 bearing the associated index.

SET CONDITIONS command 500d updates the condition list 400b in a specific record 400. Thus, SET CONDITIONS command 500d and its index parameter identify a record 400 to be modified, and a data parameter contains a new condition list field 400b for the record 400 to be modified. As may be appreciated, in the event of a lengthy new condition list field 400b, the data parameter of command 500d can be a pointer to a sequence of linked paging system data packets. In any event, SET CONDITIONS command 500d allows modification of a condition list field 400b without requiring downloading of the entire record 400, i.e., without requiring retransmission of the data field 400d of an existing record 400.

RECORD ON command 500e and RECORD OFF command 500f provide a mechanism for recording directly, i.e., digitizing, the voice broadcast 22 at the receiving device 40. Thus, RECORD ON command 500e and its index parameter begin recording of the voice broadcast 22 and storing the digitized sound data in the data field 400d of a new record 400 having in its index field 400a the value of the RECORD ON command 500e index parameter. Recording of voice broadcast 22 continues until device 40 receives the RECORD OFF command 500f. In this manner, downloading a massive volume of digitized sound data by way of data broadcast 26 is avoided because device 40 efficiently captures and digitizes the voice broadcast 22 and establishes a record 400 therefor with an ability to present such audio advertisement multiple times.

Figure 6:
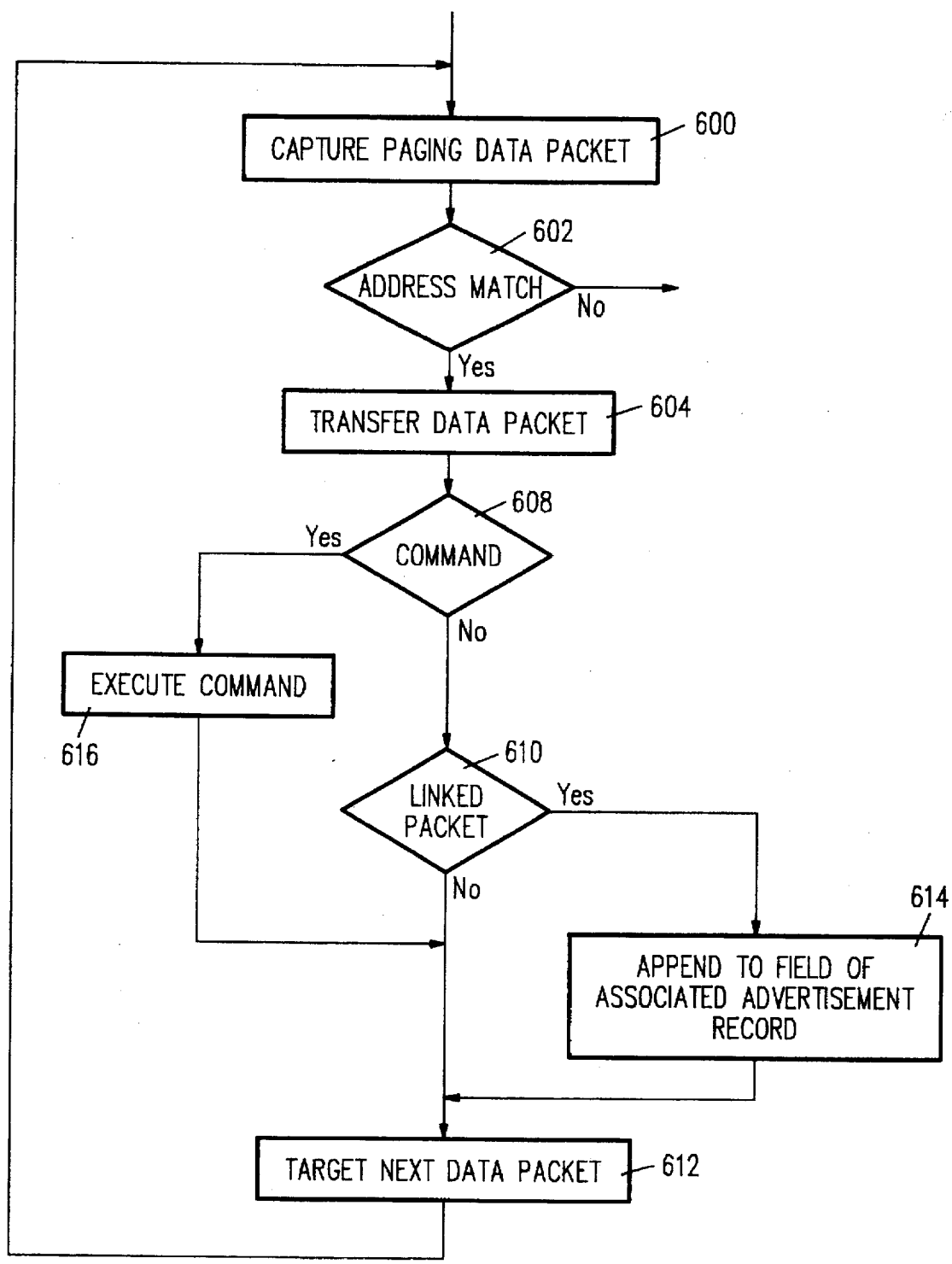
FIG. 6 is a flow chart illustrating information device programming in response to the command set of FIG. 5.

FIG. 6 illustrates by flow chart generally the process of collecting advertising information at device 40, i.e., programming for data radio 62 and microprocessor 60. In FIG. 6, advertising information capture, store, and management procedures begin at block 600 where data radio 62 activates and captures a paging data packet. In decision block 602, data radio 62 compares the address of the captured paging data packet with its address to determine a match. In no match occurs, indicating the captured packet was not addressed to this data radio 62, processing branches to other unrelated programming. If a match does occur, indicating the captured paging data packet is addressed to this data radio 62, then processing advances to block 604 where data radio 62 transfers the captured paging data packet to microprocessor 60 for further processing.

Continuing to block 608, microprocessor 60 interrogates the just received data packet to determine whether it is a member of command set 500. If the data packet is not a member of command set 500, then processing branches to decision block 610 where microprocessor 60 determines whether the data packet is a member of a linked list of data packets. If the data packet is not a member of a linked list, then processing branches through block 612 where the next data packet is targeted. As may be appreciated, processing in block 612 includes appropriate interaction between microprocessor 60 and data radio 62 to cause, when necessary, data radio 62 to target a specific time slot under the paging system protocol. Following block 612, processing returns to block 600.

Returning to block 610, If the captured data packet is a member of a linked list of data packets, then processing branches through block 614 where the data portion of the captured data packet is appended to the appropriate field of an existing data record 400. Processing then continues to block 612. Returning to block 608, if the captured data packet is a member of command set 500, then processing branches through block 616 where microprocessor 60 executes the command whereafter processing advances to block 612. In this manner, device 40 responds to command set 500 and collects lengthy condition list field 400b or data field 400d for incorporation into data records 400.

Figure 7:
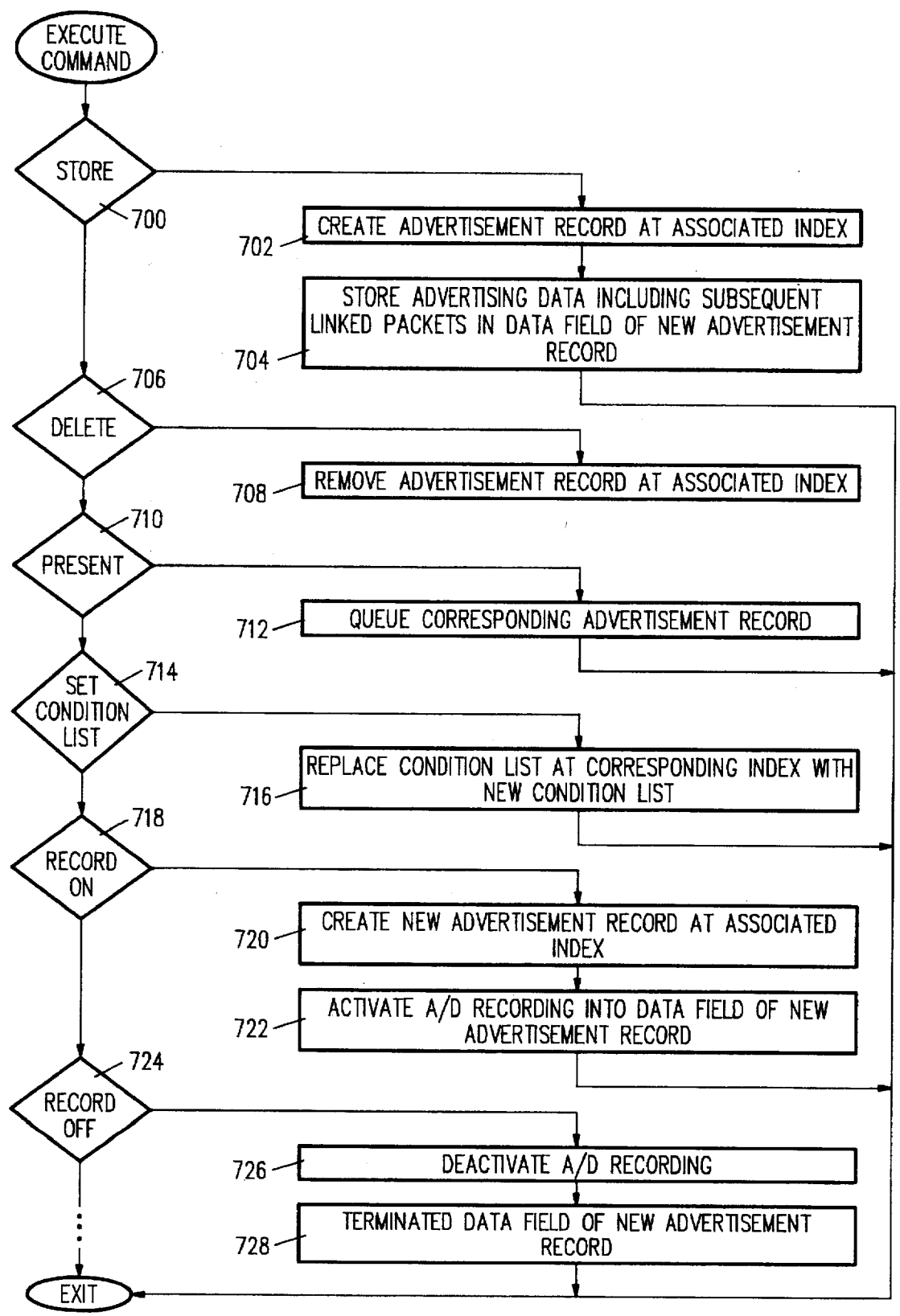
FIG. 7 is a flow chart illustrating in more detail a command execution block of FIG. 6.

FIG. 7 further details programming illustrated in the EXECUTE command block 616 of FIG. 6. In FIG. 7, program control is organized generally as a switch structure with each case branching in response to a given member of command set 500. Processing begins in decision block 700 where the STORE command 500a is detected. Upon detecting the STORE command 500a, microprocessor 60 creates in block 702 a new data record 400 with associated index, i.e., the index value provided as the index parameter to STORE command 500a. Continuing to block 704, microprocessor 60 stores the data parameter of command 500a in the data field 400d of the newly created record 400. As may be appreciated, if the data parameter of STORE command 500a represents a linked list of data packets, then microprocessor 60 prepares to later append such linked data packets to the data field 400d as indicated at decision block 610 of FIG. 6. Command execution terminates following block 704.

Decision block 706 detects presentation of the DELETE command 500b. Upon detecting the DELETE command 500b, microprocessor 60 removes in block 708 the associated advertisement record 400, i.e., that record 400 having an index field 400a matching the index parameter of the detected DELETE command 500b. Command execution terminates following block 708.

Decision block 710 detects the PRESENT command 500. If the PRESENT command 500 is detected, then processing branches through block 712 where microprocessor 60 queues for presentation the corresponding advertisement, i.e., provides to the advertisement presentation block 104 the index value provided by the index parameter of PRESENT command 500c. Command processing terminates following block 712.

Decision block 714 detects the SET CONDITION command 500d, with processing then branching through block 716 where microprocessor 60 replaces the condition list 400b of the record 400 corresponding to the index parameter provided with SET CONDITION command 500d, i.e., writes the data parameter of command 500d into the condition list 400b of the associated record 400. As may be appreciated, if the data parameter of command 500d is a pointer to a linked list of data packets, then microprocessor 60 appropriately gathers such linked list of data packets and successively writes each data packet into the condition list field 400b of the associated record 400.

Decision block 718 detects presentation of the RECORD ON command 500d. In response, processing in block 720 creates a new record 400 with the associated index value, i.e., a value corresponding to the index parameter of RECORD ON command 500d. Processing advances to block 722 where microprocessor 60 activates appropriate analog-to-digital recording of the voice broadcast 22 and delivery of the resulting digital sound data into the data field 400d of the newly created record 400. Command processing terminates following block 722.

Decision block 724 detects the RECORD OFF command 500f, causing branching through blocks 726 and 728 where microprocessor 60 deactivates the analog-to-digital recording process and terminates the data field 400d of the associated, i.e., currently being recorded, record 400. Command processing terminates following block 728.

As may be appreciated, command set 500 may include additional commands incorporated as additional case conditions under the switch structure of FIG. 7.

Figure 8:
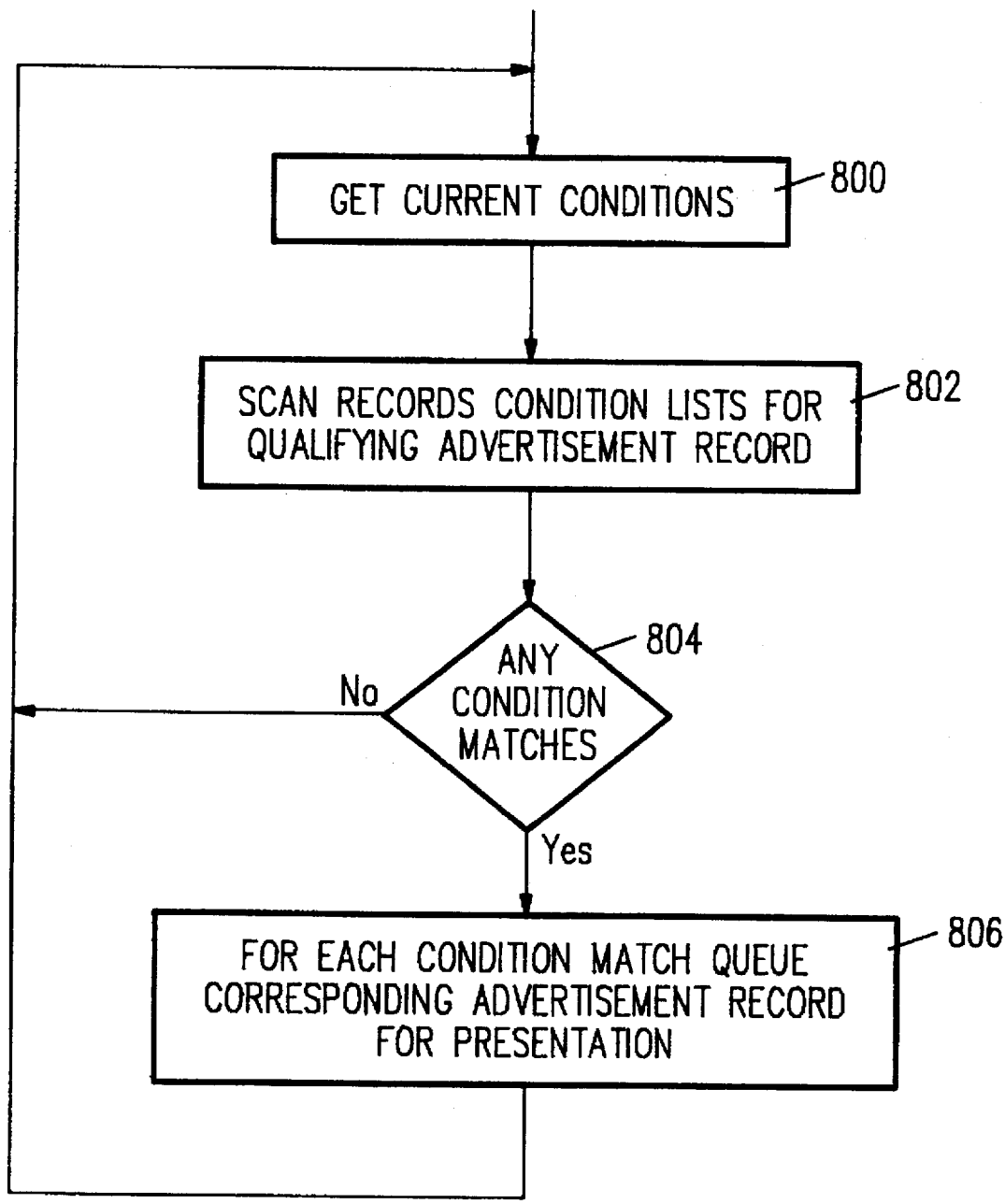
FIG. 8 illustrates a background process within the information device providing advertisement presentation in response to selected presentation conditions.

FIG. 8 illustrates background advertisement presentation processing executed by microprocessor 60 in response to current conditions detected by device 40. In other words, programming required to implement the goal of advertisement presentation in response to the condition list field 400b of each record 400. In FIG. 8, processing is organized generally as a repeating control loop which, once entered, repeats as a background process monitoring current device 40 conditions and seeking data records 400 having within the condition lists 400b matching conditions. Upon finding a match between current conditions and members of any condition list 400b, microprocessor 60 queues the associated records 400 for presentation, i.e., delivers the index values to presentation block 104.

Thus, processing begins in block 800 where microprocessor 60 collects current conditions, i.e., current time, current vehicle location, power-up, and the like. Continuing to block 802, microprocessor 60 scans records 400, i.e., scans condition lists 400b in records 400, for qualifying advertisements as indicated in decision block 804. Upon a condition list 400b member matching a current condition, processing branches to block 806 where, for each condition match, the associated index value is queued for presentation, i.e., delivered to advertisement presentation block 104. Thus, the process of detecting current conditions and queuing qualifying records 400 continues as a background process causing presentation of advertisement information in response to an associated condition required for presentation.

In operation, any given receiving device 40, once loaded with a set of records 400, travels throughout road network 12 and intermittently presents advertisements to the operator and passengers of vehicle 10. For example, if receiving device 40 contains a record 400 having in its condition list 400b longitude and latitude criteria corresponding to geographic point of interest 14a and vehicle 10 passes by or near point 14a, device 14 presents the corresponding advertisement. The operator and passengers of vehicle 10 are exposed to advertising for goods or services found nearby. Advertisement records 400 with a condition list 400b indicating periodic presentation, e.g., every hour, are presented to the operator and passengers of vehicle 10 at regular intervals thereby reinforcing familiarity with the advertised goods or services. Advertisement records 400 containing a device 40 power-up condition are presented each time the operator turns on device 40. Advertisement records 400 may always be triggered into presentation by delivering the PRESENT command 500c to a selected one or group of receiving devices 40. Accordingly, a variety of conditions may be incorporated into condition lists 400b or programming to issue from broadcast system 20 the present command 500c may be developed to accomplish specific advertising goals.

The paging system supports group addressing whereby a single paging data packet transmission may be addressed to groups of receiving devices. Accordingly, advertising presentation may be accomplished relative to listeners defined as groups. For example, by developing a profile for the users of each device 40, e.g., age, typical products purchased, class of neighborhood, and the like, as is typically done in advertising strategies, the advertiser defines groups of listeners. By loading into receiving devices 40 advertisements tailored to group needs, the advertiser targets specific audiences with specific advertising messages. For example, one advertisement may be loaded into one group of receiving devices 40 while a second advertisement is loaded into a second group of receiving devices 40. Even though different advertisements are loaded into different receiving devices 40, all such advertisements may be associated with the same index. Accordingly, issuance of the PRESENT command 500c relative to such common index value causes distinct advertisement presentation for different groups of listeners. As may be appreciated, the radio signal transmission time associated with issuing the PRESENT command 500c is quite small as compared to similar advertisement broadcast time required to deliver by conventional means the same advertisement presentation, i.e., broadcast time required to present the advertisement to listeners currently tuned to the broadcast facility.

Thus, an improved method and apparatus for message or advertisement presentation has been shown and described. Advertisement information is disseminated widely by radio signal broadcast to a population of receiving devices. The receiving devices store this advertising information and present such information multiple times without requiring repeated radio signal transmission. In this manner, advertising presentation is made efficient with respect to radio transmission resources, and therefore less costly in regard to the costs associated with transmission of advertisement by radio signal.

It will be appreciated, that the present invention is not restricted to the particular embodiment or embodiments that have been described and illustrated herein, and that variations may be made therein without departing from the scope of the invention as found in the appended claims and equivalents thereof.

What is claimed is:

1. An advertising system comprising:
    a radio signal transmission facility providing voice and data broadcast signals; and
    a plurality of remote receiving devices collecting said voice and data signal broadcasts, each of said receiving devices storing selected portions of at least one of said voice and data broadcasts as a stored advertisement therein in association with an index value whereby subsequent transmission within at least one of said voice and data broadcasts references said index value and causes said remote receiving device to present the corresponding stored advertisement.

2. A system according to claim 1 wherein said transmission facility broadcasts in conjunction with said selected portion of said voice and data broadcast said index value.

3. A system according to claim 1 wherein each of said remote receiving devices stores a plurality of advertisements, each associated with an index value whereby said broadcast facility triggers presentation of a selected stored advertisement at a selected remote receiving device by broadcast of a command to a selected receiving device in conjunction with a selected index value.

4. A system according to claim 1 wherein each stored advertisement is associated with a condition for presentation and each remote receiving device monitors current conditions, compares current conditions to said conditions for advertisement presentation, and presents a stored advertisement upon finding a match between a current condition and a condition for presentation.

5. A system according to claim 4 wherein said presentation conditions include at least one of a schedule of presentation, proximity to a designated location, and time of day.

* * * * *